Figure 1:
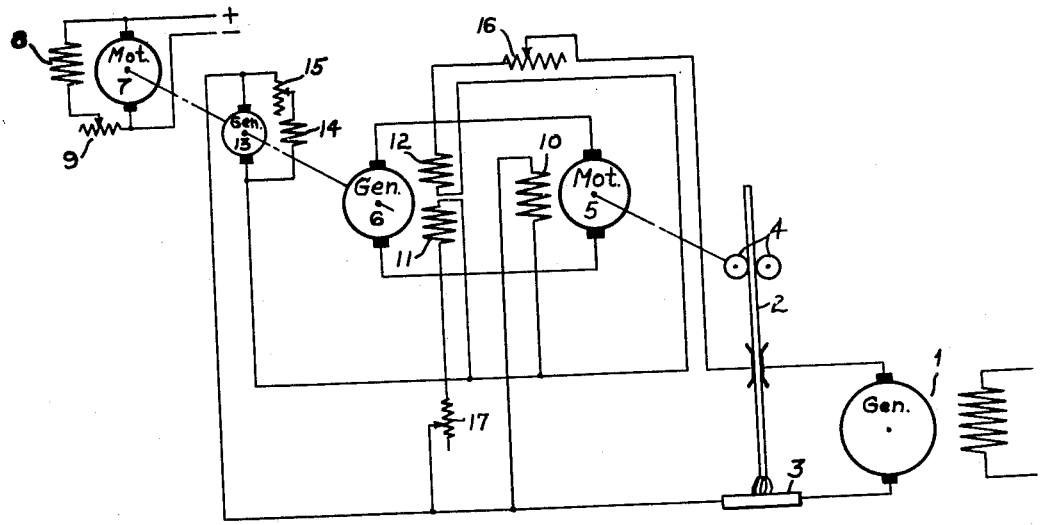

Dec. 13, 1949  H. KOCHER  2,491,319
AUTOMATIC ARC WELDING DEVICE
Filed Sept. 20, 1946

Inventor
Hermann Kocher,
By Pierce, Scheffler & Parker,
Attorneys.

Patented Dec. 13, 1949

2,491,319

UNITED STATES PATENT OFFICE 2,491,319

AUTOMATIC ARC WELDING DEVICE

Hermann Kocher, Engstringen, near Zurich, Switzerland, assignor to Aktiengesellschaft Brown, Boveri & Cie, Baden, Switzerland, a joint-stock company Application September 20, 1946, Serial No. 698,347 In Switzerland October 1, 1945

4 Claims. (Cl. 314—75)

This invention relates to a device for automatically maintaining constant the once adjusted distance between the electrode and the workpiece, or the corresponding arc potential.

Arc welding machines are known wherein the electrode advance is automatically controlled in a generally rather complicated electrical-mechanical way, with the aid of differential drives, slip couplings, planetary drives and the like. Arrangements are also known which effect the same function in a purely electrical manner by means of a special connection of the electrode-feeding motor or of the generator supplying the latter. In all these devices and arrangements, use is made of the one variable which is available, namely the arc potential, in order to realize the desired regulating characteristics.

However, arrangements are also known wherein, in addition to the arc potential, use is made of a comparative potential, e. g. in the form of an auxiliary dynamo machine interposed in the main circuit of the feed motor or in such manner that the armature of the feed motor is on the one hand connected to the combination of a comparative potential and of the arc potential through a resistance and on the other hand through a direct current generator with externally excited field control driven by a direct current motor; the feed motor, the direct current generator supplying the feed motor and the driving motor for the generator being a modified form of the well known Ward Leonard system of variable speed motor control. These arrangements are however complicated and require a relatively great outlay for auxiliary machines and apparatus.

The object of the invention is to embody an automatic arc welding device, wherein the forward and return movement of the electrode is effected by a direct current motor fed by the generator element of a Ward Leonard system of motor control, making possible, in comparison with prior devices of this character, an effective regulation of the electrode advance in simple and safe manner, i. e. with extremely small outlay for machines and apparatus. According to the invention, this is realized by the fact that the generator element which supplies power to the feed motor is provided, in addition to an extraneous exciting coil, with a differential coil or winding which is excited by the arc potential and by an opposed, constant auxiliary potential in such way that at the desired magnitude of the arc potential no exciting current flows through the differential coil. However, should the arc potential deviate from its desired magnitude, current will flow in the diffrential coil to thereby alter the output voltage of the generator and speed up or slow down the feed motor as the case may require to reestablish the desired arc potential. The direction of current flow through the differential coil will depend upon the sense of the deviation of the arc potential and the magnitude of the current will vary with the magnitude of such deviation.

The invention will be further explained with reference to the drawing, in Fig. 1 of which is schematically shown, as an illustration embodiment of the invention, an automatic direct current arc welding device. Fig. 2 shows a modified form of the invention as applied to an alternating current welding system.

Figure 2:
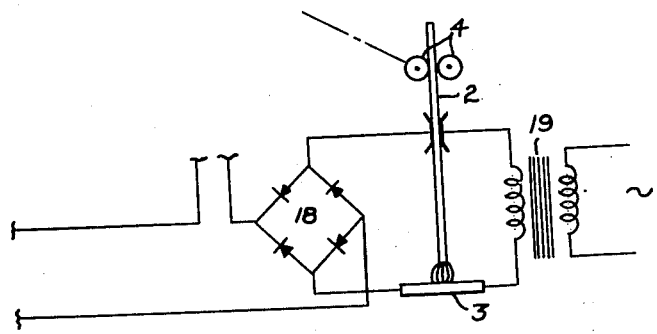

In Fig. 1, 1 designates the arc welding generator, the electrode 2 of which has to be maintained at a certain distance from the workpiece 3. For advancing the electrode 2, the advancing rollers 4 are provided, driven by a direct current motor 5 which is fed from a direct current generator 6. The generator 6 is driven by a direct current motor 7, the shunt field 8 of which may be adjusted by resistance 9 to drive generator 6 at any desired constant speed. The motor 5 and the generator 6 are each provided with an extraneously excited coil 10 and 11, respectively, which preferably remain at a constant potential, although this is not absolutely necessary. The two coils 10, 11 may if necessary also be excited e. g. from the welding generator 1. The generator 6 is also provided, in addition to the extraneous excitation, with a differential coil 12. Coupled to the motor 7 and generator 6 is an auxiliary direct current generator 13, which supplies a constant potential equal to and opposite that of the arc potential, and simultaneously serves as an exciter for the main field windings of motor 5 and the generator 6. One end of the differential field winding 12 is connected to the output of the auxiliary generator 13 while the other end of winding 12 is connected to the electrode 2 which is at arc potential. The auxiliary machine 13 is automatically excited by means of a shunt winding 14, and connected in series with the latter is a regulating resistance 15.

The operation of this device is as follows: It is to be assumed that the generator 6 has been excited by its extraneous exciter coil 11 so that the R. P. M. of the motor 5 corresponds to a feed which is correctly adjusted to the normal loss by burning of the electrode 2. A predetermined arc potential (basic value) corresponds to these relationships. The counter potential of the auxiliary generator 13 is adjusted to this basic value, so that under these conditions no current flows in the differential winding 12 of the generator 6. If now for any reason the normal electrode distance or the arc potential is altered, the resultant difference in potential at opposite ends of the differential winding 12 produces a current flow of a given direction and magnitude through this winding. The direction of current flow through winding 12 will depend upon the sense of the deviation in the arc potential from its basic value and the magnitude of the current will depend upon the amount of such deviation. The connections to winding 12 are so selected that for example if the arc potential rises above its basic value or the electrode distance becomes greater than normal, the winding 12 has a field-supporting action and increases the total field of generator 6. In consequence of this, the output voltage of generator 6 is correspondingly increased causing the electrode feed motor 5 to run faster and thus equalize the excessive distance and arc potential. The reverse takes place if the arc potential drops below its basic value. Accordingly, depending upon requirements, the differential winding 12 receives a current impulse of positive or negative direction, always with the object of maintaining the arc potential precisely at the desired basic value. It is at the same time an electrical differential, but is much less sluggish than a mechanical differential and therefore more effective. The effectiveness can be very greatly increased in such manner that a deviation in arc potential of for example only about 5% will readily produce generator potential changes and with it motor R. P. M. changes of 40–50%. The only prerequisite is that the generator 6 at its normal R. P. M. is not yet saturated and that the ampere turns of the coil 12 be sufficiently large; the latter is easily possible, even with a small copper outlay, because winding 12 under normal conditions carries no load and can hence be designed for a higher than usual conductor current density without any danger of overheating. With the aid of an adjusting resistance 16 arranged in series with the winding 12, the aforementioned sensitivity of the regulation can be adjusted as desired, to correspond to desired requirements.

Moreover, as hereinafter set forth, with this connection the arcing (ignition) takes place in a manner which is correct in every respect. Directly before the arcing, the generator 6 is excited by the windings 11 and 12, the excitation from winding 12 being in that degree in which the no-load potential of the welding generator 1 is higher than the counterpotential of the auxiliary machine 13. The motor 5 thus runs at a certain forward speed until the electrode 2 touches the workpiece 3. The arc short-circuit collapses the potential of the welding generator 1 practically to zero, the result of which is that now the entire counterpotential of the machine 13 acts, in field-weakening manner, on the differential winding 12. Thus, the field of the coil 12 overbalances severalfold that of the coil 11. The generator 6 therefore immediately reverses its polarity and hence reverses the motor 5. Consequently, there is a backward movement of the electrode 2 which continues until the normal electrode distance is reached. Thereupon the regulation proceeds again in normal manner.

As is evident from the foregoing description, the adjustment of a desired arc potential can be effected at will by changing the counterpotential of the auxiliary machine 13, and that in simple manner by altering the shunt-regulating resistance 15 of winding 14. Of course, any change in output voltage of auxiliary generator 13 will also alter the extraneous excitation of the motor 5 and generator 6. However, the change in excitation will have no effect upon the basic speed of the motor 5, since for example an increase in current in generator field winding 11 while producing an increase in output voltage applied to the armature element of motor 5 is offset by an increase in field strength of the motor which has a speed reducing effect. In other words: The counterpotential machine 13 can directly serve as exciter for both motor 5 and generator 6 since a change in arc potential depends practically only on the action of the corresponding counterpotential.

The arc potential may also be adjusted, although less efficiently, by a regulation with the aid of a resistance 17, directly in the exciter field circuit 11 of the generator 6. This type of regulation differs from that first described in that, at certain values of the arc potential, the counterpotential of the auxiliary generator 13 can be greater or smaller by a small value than the arc potential. In such cases, the closed-circuit current in the differential coil 12, i. e. the current at the basic value of the arc potential, is no longer zero, but has a small positive or negative value. The regulating impulses are then based on this value as a basis. The mentioned sensitivity of the device is not impaired by this type of regulation.

The described device may, if necessary, also be used for alternating current arc welding. This merely requires a rectification of the arc potential, e. g. by means of a dry rectifier, as shown in Fig. 2, where 18 designates the rectifier and 19 the transformer which takes the place of the direct current generator 1 in Fig. 1. The remainder of the connections are the same as in Fig. 1. The rectifier 18 may be made small because normally it supplies no current.

I claim:

1. In an arc welding system including a power supply for establishing an arc between a work piece and an electrode and a feed motor for feeding the electrode toward the work piece as the electrode is consumed, means for automatically controlling the speed of the feed motor to maintain a substantially constant arc potential; said feed motor controlling means comprising, a direct current generator, said generator including main and auxiliary field windings each arranged for excitation externally, connections between said generator and feed motor, means driving said generator at a substantially constant speed, means supplying said main winding with a substantially constant energizing potential, means producing a substantially constant counterpotential and circuit means arranging said auxiliary generator field winding for energization in accordance with the instantaneous difference between said counter and arc potentials to thereby alternatively effect an increase or decrease in the total field strength of said generator, the direction of current flow through said auxiliary field winding being determined by the sense of the difference between said potentials.

2. An arc welding system as defined in claim 1 wherein the field winding of said feed motor is externally excited, the means producing said counterpotential comprises an auxiliary direct current generator driven by said generator driving means, and the output of said auxiliary generator is connected to the main field winding of said generator and the field winding of said feed motor.

3. An arc welding system as defined in claim 1 wherein the field winding of said feed motor is externally excited, the means producing said counterpotential comprises an auxiliary direct current generator driven by said generator driving means, the main field winding of said generator and the field winding of said feed motor are connected in parallel across the output of said auxiliary generator, and the terminal ends of said auxiliary generator field winding are connected respectively to one lead carrying the output potential of said auxiliary generator and another lead carrying the arc potential.

4. An arc welding system as defined in claim 1 wherein the field winding of said feed motor is externally excited, the means producing said counterpotential comprises an auxiliary direct current generator driven by said generator driving means, the main field winding of said generator and the field winding of said feed motor are connected in parallel across the output of said auxiliary generator, one side of the output from said auxiliary generator lies at the potential of the work piece and the terminal ends of said auxiliary generator field winding are electrically connected respectively to the other side of the output from said auxiliary generator and to said electrode.

HERMANN KOCHER.

REFERENCES CITED

The following references are of record in the file of this patent:

UNITED STATES PATENTS

| Number | Name | Date |
|---|---|---|
| 1,869,079 | Rosenberg | July 26, 1932 |
| 1,989,546 | Chapman | Jan. 29, 1935 |
| 2,007,751 | Chapman | July 9, 1935 |
| 2,057,521 | Harding | Oct. 13, 1936 |
| 2,311,462 | Neal | Feb. 16, 1943 |
| 2,375,039 | Reichert | May 1, 1945 |
| 2,427,744 | Rebuffoni | Sept. 23, 1947 |

FOREIGN PATENTS

| Number | Country | Date |
|---|---|---|
| 373,735 | Great Britain | June 2, 1932 |
| 439,900 | Great Britain | Dec. 17, 1935 |
| 629,620 | France | Aug. 1, 1927 |